US012801780B2

(12) United States Patent
Barnes et al.

(10) Patent No.: US 12,801,780 B2
(45) Date of Patent: Nov. 17, 2026

(54) SYSTEMS AND METHODS FOR INTEGRATING DATABASES WITH PERMISSION-BASED ACCESS ON A USER INTERFACE

(71) Applicant: The PNC Financial Services Group, Inc., Pittsburgh, PA (US)

(72) Inventors: Stephen Barnes, Pittsburgh, PA (US); Joseph Quinan, Pittsburgh, PA (US); Harish Babu Konda, Pittsburgh, PA (US); Michael S. Masterson, Pittsburgh, PA (US)

(73) Assignee: THE PNC FINANCIAL SERVICES GROUP, INC., Pittsburgh, PA (US)

( * ) Notice: Subject to any disclaimer, the term of this patent is extended or adjusted under 35 U.S.C. 154(b) by 0 days.

(21) Appl. No.: 18/971,771

(22) Filed: Dec. 6, 2024

(65) Prior Publication Data

US 2026/0004001 A1 Jan. 1, 2026

Related U.S. Application Data

(60) Provisional application No. 63/665,872, filed on Jun. 28, 2024.

(51) Int. Cl.
*G06F 21/62* (2013.01)

(52) U.S. Cl.
CPC ................................ *G06F 21/6245* (2013.01)

(58) Field of Classification Search
CPC ....... G06F 21/6245; G06F 21/60; G06F 21/62
See application file for complete search history.

(56) References Cited

U.S. PATENT DOCUMENTS

2010/0325021 A1* 12/2010 Fasching ................ G06Q 40/12 705/30
2011/0016046 A1* 1/2011 Lindstrom ............ G07F 19/202 709/206
2014/0181914 A1* 6/2014 Kling ...................... H04L 63/10 726/4
2014/0325639 A1* 10/2014 Hori ...................... H04W 12/12 726/17
2015/0363774 A1* 12/2015 Priebatsch ......... G06Q 20/3223 705/76

(Continued)

*Primary Examiner* — Lynn D Feild
*Assistant Examiner* — Ethan V Vo
(74) *Attorney, Agent, or Firm* — FINNEGAN, HENDERSON FARABOW, GARRETT & DUNNER, LLP

(57) ABSTRACT

The disclosed embodiments describe systems and methods for approving a transfer. User information may be accessed for a plurality of users in a group. Account information for a plurality of disparate electronic accounts associated with the group may be accessed. The disparate electronic accounts may be integrated and managed through a central entitlements engine. Permissions information associated with the user information and the account information may be accessed. A transfer request for an account in the plurality of disparate electronic accounts may be received from a first user device associated with a first user of the plurality of users. The transfer request may be sent to a second user device associated with a second user of the plurality of users. An electronic indication of an approval of the transfer request may be received. The permissions information may be modifiable by input from the second user device.

18 Claims, 8 Drawing Sheets

(56) References Cited

U.S. PATENT DOCUMENTS

| | | | | |
|---|---|---|---|---|
| 2016/0232609 | A1* | 8/2016 | Lindemulder | G07F 9/001 |
| 2017/0148013 | A1* | 5/2017 | Rajurkar | G06Q 20/102 |
| 2018/0012203 | A1* | 1/2018 | Hall | G06Q 20/02 |
| 2021/0264001 | A1* | 8/2021 | Tomoda | G06Q 30/0185 |
| 2023/0306127 | A1* | 9/2023 | Shua | G06F 21/6218 |
| 2024/0064060 | A1* | 2/2024 | Alfraih | H04L 63/1425 |
| 2024/0095744 | A1* | 3/2024 | Hecht | G06Q 20/4016 |
| 2024/0193613 | A1* | 6/2024 | Patel | G06Q 20/3255 |
| 2024/0244060 | A1* | 7/2024 | Garg | H04L 63/104 |
| 2024/0252048 | A1* | 8/2024 | Tran | A61B 1/000096 |
| 2024/0305669 | A1* | 9/2024 | Hyder | H04L 63/10 |
| 2025/0061526 | A1* | 2/2025 | Davis | G06Q 10/101 |
| 2025/0200441 | A1* | 6/2025 | Shah | G06N 20/00 |
| 2025/0202903 | A1* | 6/2025 | Fry | H04L 63/105 |
| 2025/0209402 | A1* | 6/2025 | Gholap | G16H 40/20 |

* cited by examiner

SYSTEMS AND METHODS FOR INTEGRATING DATABASES WITH PERMISSION-BASED ACCESS ON A USER INTERFACE

CROSS-REFERENCE TO RELATED APPLICATIONS

The present application claims the benefit of priority of U.S. Provisional Application No. 63/665,872, filed Jun. 28, 2024, the entire contents of which are incorporated herein.

TECHNICAL FIELD

The present disclosure relates generally to systems and methods for integrating databases with permission-based access on a user interface. More specifically, the present disclosure relates to managing and approving transfer requests between electronic accounts by accessing user, account, and permission data, with features for fraud monitoring, automatic approval, and user permission management on a user interface.

BACKGROUND

Groups of users or legal entities often have a variety of financial accounts under various combinations of user or company names, and these users need a way to control access to these accounts and regulate transfers to and from the accounts. The groups may wish to establish different hierarchical levels of control or access to the accounts for each user. Such an approach may require a unified system to assign privilege levels for all users and for each account in a group.

Presently, management of access to accounts for different entities is performed in a disjointed way, where various technologies are used to establish control or permission levels for each legal entity in subgroups of the legal entities, based on subgroups of the type of accounts. For example, in financial institutions, retail banking accounts may be one subgroup and asset management accounts may be another subgroup. In this example, different legal entities may be associated with the different subgroups of the group or family, and there may no holistic system to view, access, or maintain the different accounts associated with the entire group or family. Such a system may be limited in accessibility and usability, particularly for a larger family that has a large assortment of accounts to manage for a large number of legal entities. In a further complication, some of the legal entities may be associated with multiple individuals within the family in various combinations. The embodiments disclosed herein provide a more efficient way to manage an assortment of accounts for various entities in a family or group by providing a centralized platform. The platform integrates and simplifies access and control of the various accounts based on permission levels associated with each user's access to the platform or each account.

SUMMARY

The disclosed embodiments describe systems and methods for approving a transfer comprising at least one memory storing instructions and at least one processor configured to execute the instructions to perform operations. Using at least one processor from at least one database, user information for a plurality of users in a group may be accessed. From the at least one database, account information for a plurality of disparate electronic accounts associated with the group may be accessed. The plurality of disparate electronic accounts may be integrated and managed through a central entitlements engine. From the at least one database, permissions information associated with the user information and the account information may be accessed. Through a user interface associated with the central entitlements engine, a transfer request for an account in the plurality of disparate electronic accounts from a first user device associated with a first user of the plurality of users may be received. Based on the permissions information, the transfer request may be sent to a second user device associated with a second user of the plurality of users. From the second user device, an electronic indication of an approval of the transfer request may be received. The permissions information may be modifiable by input from the second user device.

According to some embodiments, the transfer request may include a first account in the plurality of disparate electronic accounts for sending the transfer and a second account in the plurality of disparate electronic accounts for receiving the transfer, and the first and second accounts may be maintained by one entity.

According to some embodiments, the transfer request may include a first account in the plurality of disparate electronic accounts for sending the transfer and a second account in the plurality of disparate electronic accounts for receiving the transfer, and the first and second accounts may be each maintained by different entities.

According to some embodiments, the second user device may be configured to approve transfers for the plurality of disparate electronic accounts.

According to some embodiments, the processor may be further configured to send an authentication request to the first user device or the second user device and receive an authentication response to provide access to an application through the user interface. The user interface may be configured to receive input from the first user or the second user.

According to some embodiments, the application may be configured to allow the first user device or the second user device to access the user information, the account information, and the permissions information.

According to some embodiments, the application may be configured to allow the second user device to update the user information, the account information, and the permissions information.

According to some embodiments, the processor may be further configured to send the transfer request to a fraud monitoring application and receive a response from the fraud monitoring application providing a notification on the second user device of a detected fraudulent activity.

According to some embodiments, the processor may be further configured to automatically approve or disapprove the transfer request based on rules established by the second user.

According to some embodiments, the processor may be further configured to automatically approve or disapprove the transfer request based on a machine learning model trained on previous transfer data.

According to some embodiments, the processor may be further configured to approve or disapprove a request for a permission change associated with the permissions information based on a machine learning model trained on previous permissions information.

According to some embodiments, receiving the request may initiate a delegation form to be completed automatically using a machine learning model.

According to some embodiments, the permissions information may be updated to remove, by the second user, an access permission associated with the first user.

According to some embodiments, the processor may be further configured to send a permissions change request to a fraud monitoring application and receive a response from the fraud monitoring application informing the second user of a detected fraudulent activity.

According to some embodiments, the central entitlements engine may provide an account update for each of the plurality of disparate electronic accounts for the group and the user interface may display the account updates.

According to some embodiments, from a third user device associated with a second user of the plurality of users, a second electronic indication of a second approval of the transfer request may be received. The permissions information may be modifiable by input from the third user device.

According to some embodiments, the second device may receive a plurality of transfer requests simultaneously and the second user may select the plurality of transfer requests to approve.

The disclosed embodiments describe systems and methods for integrating a plurality of disparate electronic accounts comprising at least one memory storing instructions and at least one processor configured to execute the instructions to perform operations. From at least one database, user information for a plurality of users in a group may be accessed. From the at least one database, account information for the plurality of disparate electronic accounts associated with the group may be accessed. The user information and the account information may be integrated into an application accessed by a device with a user interface. From the at least one database, permissions information associated with the account information and the user information may be accessed. The account information and the user information may be displayed on the user interface when a first user possesses access permissions associated with the permissions information. The permissions information may be modifiable by a second user to allow the first user to make a transfer to or from an electronic account in the plurality of disparate electronic accounts.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Reference will now be made in detail to the disclosed embodiments, examples of which are illustrated in the accompanying drawings.

The present solution utilizes systems and methods with different approaches and components used to improve the accessibility, organization, and control of a variety of accounts for a variety of entities. These systems and methods provide a platform for managing and approving transfer requests between electronic accounts in a group of users by accessing user, account, and permission data, with features for fraud monitoring, automatic approval, and user permission or entitlements management on a user interface, where the various accounts and users can be viewed or managed on a centralized platform. This approach provides a more efficient way to manage an assortment of accounts for various entities in a family or group by providing a centralized platform. The platform integrates and simplifies access and control of the various accounts based on permission levels associated with each user's access to the platform or each account.

Figure 1:
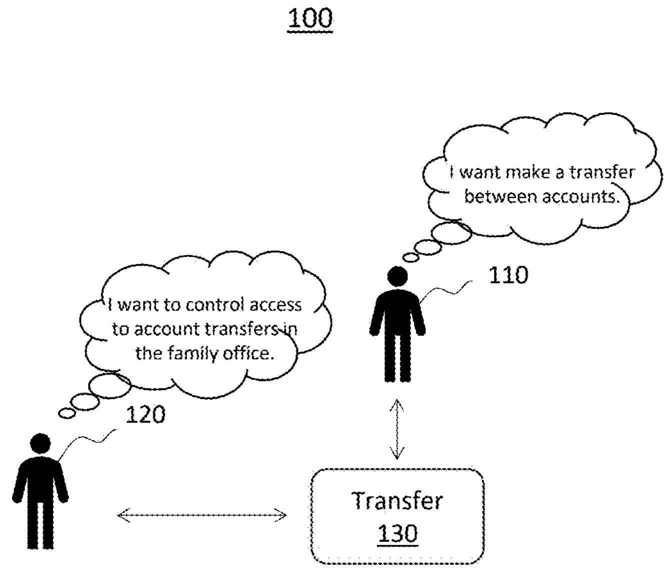
FIG. 1 illustrates a user and an authorizer in a family office considering a transfer, consistent with the disclosed embodiments.

FIG. 1 illustrates user 110 and authorizer 120 in a family office considering transfer 130, consistent with the disclosed embodiments. User 110 may be any individual or entity enabled to access accounts that may be used for transfer 130. Authorizer 120 may be any entity responsible for granting or denying permissions for a specific action, process, request. An exemplary user may include an employee of an organization, or a member of a genetic family (i.e., son, daughter, father, etc.). As used herein, family may refer to any person or entity who has been given access to financial accounts. Transfer 130 may be moving money or anything of value between one or more accounts or from one entity to another. Transfer 130 may involve transferring assets (e.g., money, securities, equities, etc.) domestically or internationally and within the same financial institution or between different institutions. Transfer 130 may involve various electronic transfers including wire transfers (e.g., SWIFT, Fedwire, etc.), automated clearing house (ACH) transfers, electronic funds transfers (ETFs), or peer-to-peer transfers (e.g. PayPal®, Venmo@, Zelle®, etc.). Transfer 130 may also include trades relating to investments including financial markets, stocks, bonds, commodities, etc.

In FIG. 1, user 110 wishes to make transfer 130 between accounts. The accounts may be financial accounts in a family office, or shared accounts in a group of users. A family office may be an entity that assists in managing accounts, access to accounts, and members of a family or office group. The accounts may be associated with various individual members of the group, and each member may have different levels of access for the various accounts. For example, financial accounts may be linked to one another using one integrated system or platform maintained by the family office. Authorizer 120 may be any member of the group with the ability to accept or deny member requests or member access. Authorizer 120 may wish to view and control access to members of the group on such a platform, but authorizer 120 as shown in FIG. 1, does not have the ability to do so easily. For example, the accounts may be disjointed and it may be difficult to get a clear overview of the permission level of various users who may be associated with each account in a group.

Figure 2:
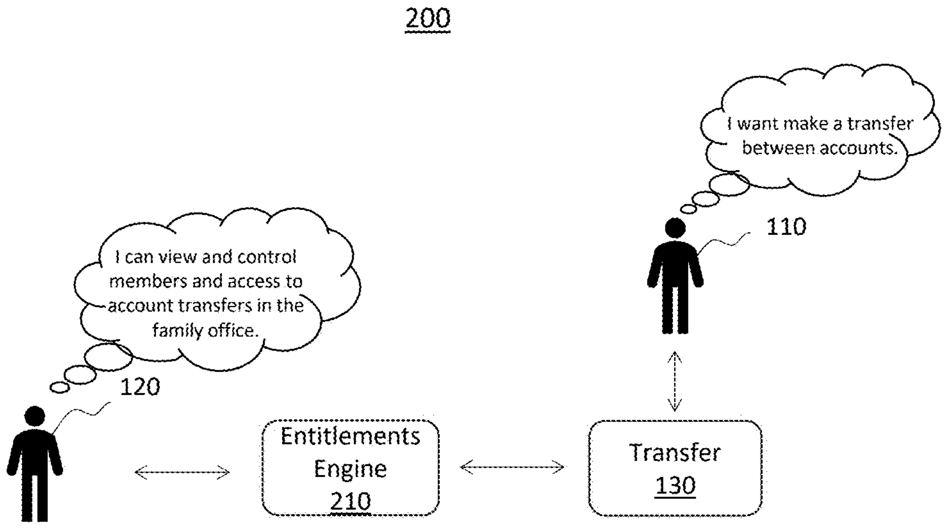
FIG. 2 illustrates a user and an authorizer using an entitlements engine to consider a transfer, consistent with the disclosed embodiments.

FIG. 2 illustrates user 110 and authorizer 120, as described with respect to FIG. 1, using entitlements engine 210 to consider transfer 130, consistent with disclosed embodiments. As with FIG. 1, user 110 wishes to make transfer 130 between accounts. Here, authorizer 120 is given access to entitlements engine 210, which is configured to allow authorizer 120 to view and control members of the family office and associated account transfers. Entitlements may be the rights or permissions granted to users to access resources in a system. Permissions may be rights assigned to users (e.g., user 110 or authorizer 120) to define what actions the users may perform. Entitlements engine 210 may be a system that manages or enforces policies relating to access or control within an application or environment. For example, entitlements engine 210 may be centralized to maintain and provide access to various accounts associated with a family office. The various accounts may be disparate electronic accounts. Disparate electronic accounts may be separate or distinctly different digital accounts (e.g., financial accounts) that may operate independently and use varying platforms, structures, or systems. Entitlements engine 210 may serve to coordinate the access and use of these accounts in a family office. By providing a centralized platform, entitlements engine 210 may provide a unified way to view or manage accounts or access accounts for various users with different levels of permissions to access such accounts. Such a platform may provide an improved efficiency for handling a family office, and may also serve to improve the security of managing various accounts by ensuring that proper access controls over the accounts are maintained.

Figure 3A:
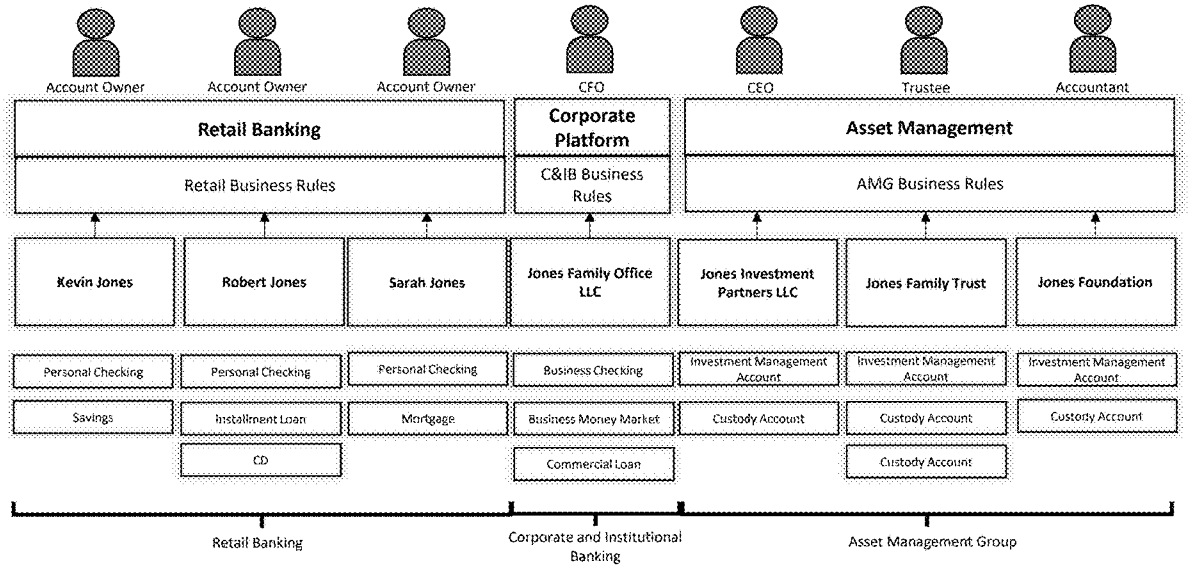
FIG. 3A illustrates disparate electronic accounts in a group environment.

FIG. 3A illustrates disparate electronic accounts in a group environment. The illustration of FIG. 3A depicts a current model of the various components of a system for maintaining or operating a family office. The family office or group environment may include familial relations, business relations, or any combination thereof. Various legal entities, including users or authorizers in a family depicted as account owners-Chief Financial Officer (CFO), Chief Executive Officer (CEO), Trustee, and Accountant—have access to various accounts affiliated with the family office. However, these accounts may be disjointed between the various types of banking, asset management, and corporate platforms and environments, which rely on various technologies. In a family office or group, it may be difficult to maintain access, security, control, and ease-of-use over the various accounts associated with the group, because these accounts may be maintained by various entities with different interfaces, locations, etc.

As shown in FIG. 3A, the accounts associated with a family office or group may personal, business, or asset management accounts maintained under various entities (e.g., legal entities). Personal accounts may be financial accounts maintained at various financial institutions and associated with individual users through retail banking. Personal accounts may include checking, savings, loan, etc. accounts. These users may be the account owners. In some embodiments, the personal accounts may be joint accounts shared between a pair of users. Business accounts may be corporate-level accounts associated with the family office or group as a business. For example, such business accounts may be owned by a limited liability company. Asset management accounts may be investment or custodial accounts owned by business entities or trusts. A legal entity may refer to the legal owner of an account.

Figure 3B:
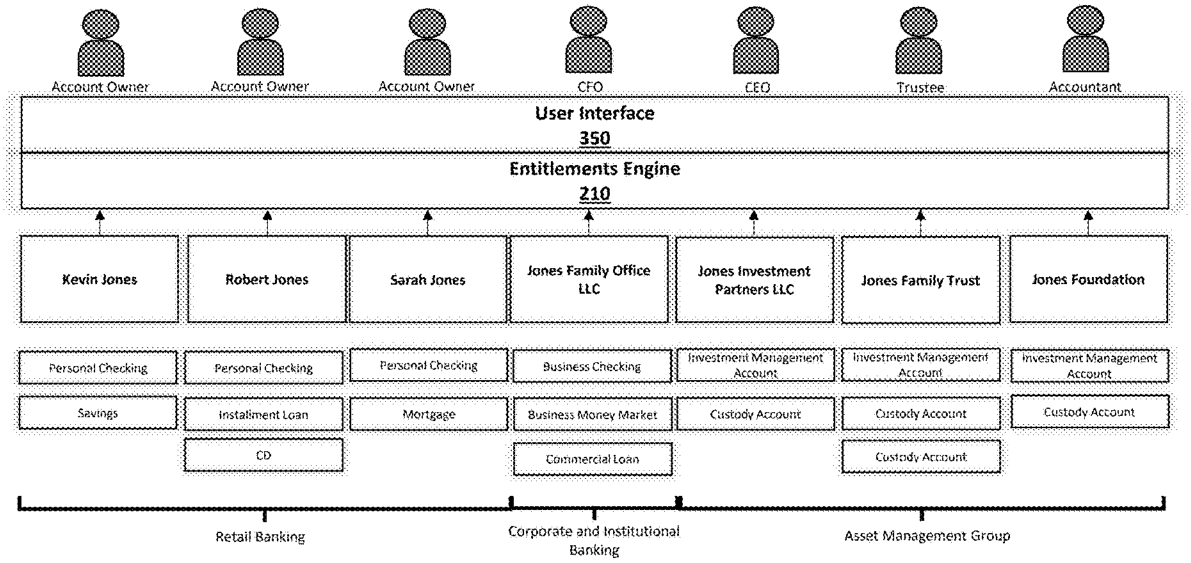
FIG. 3B illustrates an example for using an entitlements engine in a group, consistent with the disclosed embodiments.

FIG. 3B illustrates an example for using entitlements engine 210 in a group, consistent with the disclosed embodiments. Entitlements engine 210 may be a unified system for viewing, monitoring, accessing, and transferring funds to and/or from financial accounts associated with entitlements engine 210. In some embodiments, the technologies involved in maintaining the personal, business, and asset management accounts of FIG. 3A may be unified by entitlements engine 210 in a centralized platform. A centralized platform may be a system where the management, control, and processing of data and operations (e.g., for entitlements engine 210) are conducted from a central hub. For example, the various accounts shown in FIGS. 3A-3B may be integrated by entitlements engine 210 and shown to users (e.g., user 110 or authorizer 120 of FIG. 1) through the centralized platform. The same legal entities as shown in FIG. 3A may interact with entitlements engine 210 through user interface 350 to view the various accounts affiliated with the family. User interface 350 may be the point of interaction between users (e.g., user 110 or authorizer 120 of FIG. 1) and a computer system. User interface 350 may include a screen, pages, buttons, icons, text, images, videos, audio, etc. User interface 350 may be implemented as a graphical user interface (GUI), command line interface, voice user interface, touch user interface, or natural user interface. A natural user interface may use gestures, motion, eye tracking, facial recognition, or other natural behavior. User interface 350 may include receiving input from a user. Input received from the user may be any information including text, selections, buttons, files, multimedia, date and time, sliders, gestures, voice, stylus, etc. Access of each user to each account may be maintained by entitlements engine 210.

In some embodiments, entitlements engine 210 may organize information characterizing the members and the accounts associated with a family in a family office. The organization of information may include collecting the information for display to users on user interface 350. In some embodiments, entitlements engine 210 may provide an account update for each of the plurality of disparate electronic accounts for the group and the user interface may display the account updates. An account update may refer to obtaining updated account information from the financial institution holding or operating the account. For example, the updated account information may include updated financial information or account owner information. For example, members of a family may be assigned as users with various levels of access to the features of entitlements engine 210 and all accounts associated with the family may be collected for display to the users on the same platform. For example, the centralized platform may include an application designed to run entitlements engine 210. By collecting information associated with the members and accounts of a family and regulating access for all of the users according to their respective levels of authority, a family office may be run in an efficient and effective manner with a high degree of security. For example, by unifying the access point for the various accounts, there may be fewer secure logins and passwords, reducing the likelihood that such login information may be shared, lost, or used fraudulently. Additionally, users that leave the family office may be more easily removed from having access, reducing the possibility that such a user could do harm with any account to which they previously had access.

Entitlements engine 210 may store relationships between users. Relationships may be structured in a hierarchical fashion including relative positions involving legal entities, clients, advisors, relationship strategist, and financial accounts relative to each entity. Relative positions may refer to the position of one entity relative to another. For example, one position may be chief executive officer (CEO) of the family group, and another user may have a relative position of employee under the CEO. Relationships may involve familial relationships or employer-employee relationships. For example, relationships between users of the family may be familial including grandfather, mother, child, etc. In some embodiments relationships in entitlements engine 210 may be maintained by a relationship strategist. A relationship strategist may be a person or entity responsible for establishing the relationships of other users (e.g., a primary advisor). Relationships between users may also be employee relationships such as CEO, CFO, advisor, etc. Relationships may also be positions in a financial institution, including banking advisor, fiduciary advisor, investment advisor, wealth strategist, client support associate, etc.

Figure 4:
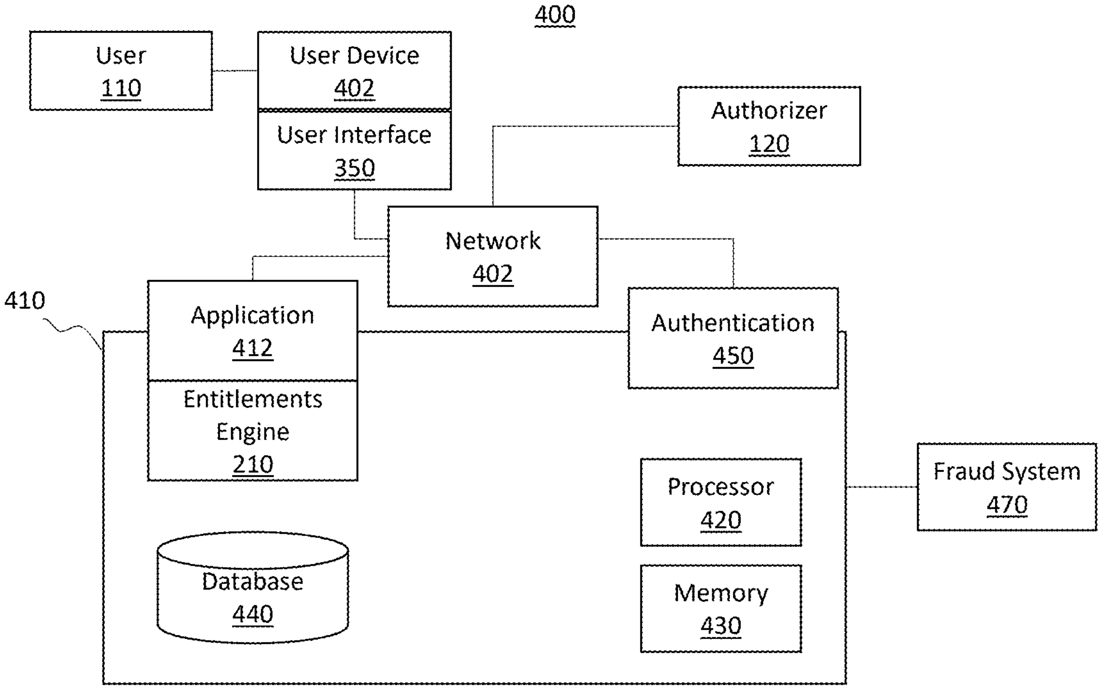
FIG. 4 illustrates an example system environment for using an entitlements engine, consistent with the disclosed embodiments.

FIG. 4 illustrates example system environment 400 for using an entitlements engine, consistent with the disclosed embodiments. Server 410 may operate application 412 with an entitlements engine (e.g., entitlements engine 210 of FIG. 2) using a processor 420 and memory 430. Information associated with entitlements for users (e.g., user 110 or authorizer 120, as described with respect to FIG. 1) in a family group may be stored in database 440 operated by server 410. Server 410 may access general information associated with users of a family office or group through database 440. For example, this general information may be information about identities and relationships of users, including relative positions within the group. User device 402 operated by user 110 or another device associated with authorizer 120 may interact with entitlements engine 210 through user interface 350 to facilitate a transfer or a request for a permissions change for user 110 or another user or member of the family. A user device, such as user device 402, may be any electronic device, such as a smartphone, tablet, or computer, that an individual interacts with to access applications (e.g. application 412), services, or data. Authentication 450 may be a part of server 410 or another service and used to authenticate the credentials for user 110 or authorizer 120. Server 410 may engage fraud system 470 to check for fraudulent activity. Fraud system 470 may be a system for monitoring fraudulent activity of users or activity on server 410 and operated by a separate system or server.

Any of the embodiments described in this disclosure may involve communication through network 402. Network 402 may be a collection of interconnected devices that communicate with each other to share data. The network may include the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Server 410 may be a computer or a system that provides resources, data, services, or functionality to other computers, devices, or users within network 402. Server 410 may refer to an individual server or a plurality of servers configured to operate together. Processor 420 may include various types of processing devices. For example, processor 420 may include a microprocessor, preprocessors (such as an image preprocessor), a graphics processing unit (GPU), a central processing unit (CPU), support circuits, digital signal processors, integrated circuits, processor memory, or any other types of devices suitable for running applications and for image processing and analysis. In some embodiments, processor 420 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures. Memory 430 may be a non-transitory memory, such as a flash memory, a random-access memory (RAM), etc. Memory 430 may be configured to store data, such as computer codes or instructions executable by processor 420. The disclosed embodiments are not limited to any particular configuration of memory 430.

Server 410 may operate application 412 to engage with user interface 350. Application 412 may be one or more software programs designed to perform specific tasks for users. Application 412 may include desktop computer applications, mobile device applications, or web/network applications. Application 412 may include a smaller application within application 412. The smaller application may include a micro-application that runs a subset of software. A micro-application may be a small application designed to perform one task. For example, a micro-application may be running the transfers within an entitlements engine for a family. Application 412 may be hosted on local computers or network systems. For example, application 412 may be run through cloud computing on a cloud network. Cloud computing may use computer systems connected over the Internet. A cloud network may be any network providing connectivity, security, management services over networks. Cloud networks may include infrastructure-as-a-service, platforms-as-a-service, software-as-a-service, etc. Examples of cloud networks may be amazon web services (AWS)™, Microsoft Azure™ and Google Cloud Platform (GCP)™.

Application 412 (or a micro-application) may involve the use of an application programming interface (API) to access or configure entitlements engine 210. An API may be an interface between two or more programs, software applications, or computer systems. APIs may include a set of rules, protocols, or tools that allow different software applications using different languages to communicate and interact with one another. An API may be maintained by server 410 to allow user 110 or authorizer 120 to use application 412 through user interface 350 to view information or perform a transfer or a permission change.

Data for entitlements engine 210 or users (e.g., user 110 or authorizer 120 in FIG. 1) using a centralized platform associated with entitlements engine 210 may be stored in database 440. Database 440 may be a database used to store data related to the operation of entitlements engine 210. A database may refer to an organized collection of information or data (e.g. structure data) stored electronically in a computer system or other storage medium. Database 440 may be a repository for storing, querying, and manipulating data (e.g. data related to entitlements engine 210), or facilitating data-driven decision-making processes and supporting various applications and services. Database 440 may include tables, records, fields, keys, indexes, relationships, and any data values. Database 440 may be configured to enable efficient data storage, retrieval, and management operations. For example, server 410 may exist entirely or in part within a cloud-computing system or cloud network. In some embodiments, database 440 may be located on a separate server located on another network. In some embodiments, database 440 may be part of a third-party server system. Database 440 may include one or more data warehouses. The data warehouse may include massively parallel processing (MPP) computing systems enabling large-scale data processing by using a plurality of processors or GPUs. MPP may be a coordinated processing of tasks by a plurality of processors or GPUs that may work on different parts of a task simultaneously. The data warehouse may include use of traditional data warehouses or cloud data warehouses. Examples of traditional data warehouses (e.g., on-premises) are Teradata™, IBM Db2™, and Oracle Exadata™ Examples of cloud data warehouses are Amazon Redshift™, Google BigQuery™, Snowflake™, and Microsoft Azure Synapse Analytics™. Any of these examples of data warehouses may use MPP.

Application 412 using an entitlements engine may enable an organization of users of various access levels with information associated with the family office. An access level may be a level of permission associated with a user, also referred to as a permission level. An access level may establish whether a user has viewing privileges, transferring privileges, permission changes privileges, etc. For example, a user may be a type of authorizer (e.g., authorizer 120) for another user (e.g., user 110). In another example, a user may have the highest access level (e.g., a CEO) and may be able to add permissions for any user and any account. Access levels may change as permissions change for each user. In some embodiments, a first user may be user 110 requesting a transfer of funds in or out of an account, and a second user may be authorizer 120 checking the transfer for authorization. For example, as described herein, user 110 may wish to make a transfer of funds out of an account and provide credentials to log into application 412 associated with entitlement engine 210 to begin the process of making the transfer between accounts if the user has the access level or permissions to do so. Authorizer 120 may be given control over whether to allow the transfer if authorizer 120 has a higher permissions or access level. For example, permissions or access levels may be tiered such that authorizer 120 is at a higher tier than user 110, allowing authorizer 120 to approve or block transfers or other actions attempted or initiated by user 110. For example, authorizer 120 may be prompted to allow or block a transfer of funds initiated by a user. In some embodiments, limits or thresholds of account transfers may be used to determine when to prompt authorizer 120. For example, if a transfer of funds from a particular account is above its designated limit for a particular user, then authorizer 120 may be notified and authorizer 120 may allow or block the transfer. In another example, as described herein, user 110 may wish to make a permission change to a permission or access level associated with a particular account in the family, and entitlements engine 210 may request authorization from authorizer 120 through a device.

In some embodiments, entitlements engine 210 may provide different levels of control to authorizer 120 or user 110 for the various accounts associated with a family office. In some embodiments, user 110 and authorizer 120 may be each assigned a different permission level. For example, levels of control may be viewing all accounts, being unable to view some accounts, being able to initiate limited transfer of funds for certain accounts, being able to transfer funds from any accounts, or being able to change permissions for other users. A permission level may be a degree of access or permission that a user (e.g., user 110 or authorizer 120) has over a resource in a system. The permission level may be fixed or variable depending on the level of access for each of a plurality of users in the family. The different permission levels may be hierarchical such that one user may have control over another user's access to information in entitlements engine 210. For example, user 110 may have a low level of permission and authorizer 120 may have a higher level of permission such that when user 110 attempts a transfer or a permission change, entitlements engine 210 requests authorization from authorizer 120.

In some embodiments, user device 402 associated with authorizer 120 may be configured to approve transfers for the plurality of disparate electronic accounts. For example, authorizer 120 may be assigned a role of the head of the family in a family office such that all authorizations may be approved or blocked by authorizer 120. In some other embodiments, authorizer 120 may fulfill a role with an authority below that of the head. In such embodiments, authorizer 120 may serve the role of an intermediary authorizer and approve a transfer or a permission change, which may then be sent to a second authorizer with a higher level of authorization for authorization of the transfer. This may involve use of another device associated with the second authorizer. For example, a transfer of funds from a custodial account may be initiated by a user and a prompt may be sent to a device associated with authorizer 120, who may approve the transfer, but due to a preestablished limitation of the account (e.g., tax implications, etc.), a second authorizer, such as a CFO, may be prompted to approve or block the transfer. Server 410 may enable authorizer 120 to approve or block one or more transfers or permission changes simultaneously. In some embodiments, a second device may receive multiple transfer requests and authorizer 120 may select several of the transfer requests to approve simultaneously. For example, user 110 may submit multiple transfer requests for at least one account in the group, and the second device may provide authorizer 120 with the ability to select multiple transfers to approve or block at once. For example, this ability to select multiple transfers or other such options may include displaying the options on a GUI on the second device through application 412. For example, entitlements engine 210 may produce a GUI for authorizer 120, and the GUI may provide a list of transactions along with selectable bubbles for authorizer 120 to choose which transfer requests to accept or prevent. If one of the authorizers disapproves of the transfer, it may be denied. In some embodiments, each of the plurality of authorizers may have different permission levels in a hierarchy such that each authorizer must approve of the transfer or the permission change before the next authorizer with a higher permission level is requested for authorization. This iterative process may continue until the authorizer with the highest permission level requested by entitlements engine 210 has approved or disapproved of the transfer or the permission change.

In some embodiments, a transfer request may include one account in a plurality of disparate electronic accounts for sending a transfer. In those embodiments, a second account in the plurality of disparate electronic accounts may receive the transfer. In some of those embodiments, both accounts may be maintained by one entity. For example, the first and second accounts may be different financial accounts (i.e., bank or investment accounts). For example, the first account may be a personal account associated with a user and the second account may be an investment account. For example, the entity may be one financial institution and a transfer may be an internal transfer within the financial institution between accounts in the family. An internal transfer within a financial institution may also include sending or receiving to or from an account in the family to or from an account outside the family but maintained by the same financial institution. In some other embodiments, the accounts in the plurality of disparate electronic accounts may be maintained by different entities. For example, user 110 may send a transfer request to send money from an account in the family office to an account at a different financial institution. Such a transfer may include a wire transfer, ACH transfer, ETF transfer, etc., as discussed with respect to FIG. 1.

In some embodiments, server 410 may use authentication 450 to verify user 110 or authorizer 120 credentials prior to allowing access to entitlements engine 210. Authentication 450 may be a process of verifying users, devices, or entity information before granting access to a system. Credentials may include any information used to verify identity, including usernames, passwords, tokens, biometric data, tax ID, SSN, PIN codes, smart cards, mobile devices, etc. Authentication 450 may be done using various methods including single-factor authentication using one type of credential, two-factor authentication using two credentials, or multi-factor authentication using two or more separate credentials. Authentication 450 may involve different protocols including OAuth, security assertion markup language (SAML), OpenID, lightweight directory access protocol (LDAP), etc. Authentication 450 may be done on server 410 or on a separate server or system (e.g. Google Authenticator®, Authy®, etc.).

In some embodiments, authentication 450 may include server 410 sending an authentication request to user device 402 or a second user device associated with authorizer 120. A response to the authentication request may be received by server 410, allowing access to application 412 through user interface 350, which may be used to receive input from user 110 or authorizer 120 through a user device. The response to the authentication request may be received input from user 110 or authorizer 120. The response may be a verification that user 110 or authorizer 120 was verified, or the response may be a rejection of access to entitlements engine 210. In some embodiments, authentication 450 for user 110 may use input from authorizer 120. Input may be a selection on a GUI, a text message, a gesture (e.g., a swipe or hand movement), a phone call, etc. For example, a message may be sent to authorizer 120 that user 110 wishes to log onto application 412 by inputting their username and password to access entitlements engine 210, and authorizer 120 may select to approve or disapprove of the login attempt.

In some embodiments, application 412 may allow user device 402 associated with user 110 or authorizer 120 to access user information, account information, and permissions information. User information may be any data associated with an individual (e.g., user 110 or authorizer 120). User information may include personal information (name, address, etc.), account information (user identification, username, password, etc.), user preferences, behavioral data collected by server 410, location information (e.g., GPS coordinates), device information, etc. Account information may be details associated with financial accounts. Account information may include account owners, account custodians, account numbers, account types (investment, checking, savings, etc.), creation dates, login dates, etc. Account custodians may be individuals or entities responsible for care of the accounts. In some embodiments, server 410 may allow a custodian to view information associated with entitlements engine 210 or make a transfer or a permission change. Custodian may be an individual or entity appointed to manage or safeguard assets on behalf of an account owner/holder. For example, a custodian may maintain an account for a minor. In another example, a custodian may be an investment asset firm managing various investment assets in a family office. The custodian may be operating through server 410 directly or through a separate server or system. For example, a custodian 480 may hold power of attorney to operate a trust.

Permissions information may be any information related to permissions or permission levels associated with user 110 or authorizer 120, or other members associated with the family office). Any combination of user information, account information, and permissions information may be stored in database 440 in server 410 or another server. In some embodiments, the application may allow a device associated with authorizer 120 to update user information, account information, or permissions information. Updating this information may include adding, deleting, or modifying information in database 440. For example, updating the information may be initiated by the permission change. In another example, updating the information may include receiving from authorizer 120 a request to give permission to a user to view and access an account and the user information, account information, and permissions information may be updated to reflect this change in access to the account. For example, server 410, through an application, may provide a list to authorizer 120 of users able to access each account, and server 410 may initiate a permission change by authorizer 120 requesting to add the user, through a device running the application.

In some embodiments, a transfer request or permission change request may be sent to fraud system 470. A response may be received from fraud system 470 to provide a notification on a second user device associated with authorizer 120 of a detected fraudulent activity. Detecting fraudulent activity may be the identification of actions, patterns, or anomalies that deviate from normal behavior of a user. Detection of fraudulent activity may indicate potential unauthorized or deceptive actions aimed at gaining unfair or illegal benefits. Fraud system 470 may be a fraud detection and prevention system used to identify and mitigate detected fraudulent activities associated with viewing information on associated with entitlements engine 210 or performing the transfer or the permission change. Fraud system 470 may monitor for fraudulent activity associated with entitlements engine 210 or application 412 by monitoring for irregular patterns, anomalies, or suspicious behaviors that deviate from normal behavior for a user or account. Monitoring may include checking for unusual transfer volumes, transfers to unrecognized accounts, access from unfamiliar locations or devices, rapid withdrawals, or activities inconsistent with a user's typical behavior. For example, geolocation using user device 402 may be used to determine if the location of user 110 is acceptable or normal. Geolocation may include tracking the coordinates of a user by use of a global positioning system (GPS) or information provided via network 402.

Fraud system 470 may be run on server 410 or on another server or system (e.g., Actimize). Fraud system 470 may receive user information or account information from server 410 and perform fraud checks by comparing the user or account information to known information or by analyzing the user or account information. Fraud checks may be processes to detect and mitigate fraudulent activities to ensure the integrity of fund transfer or permission changes. For example, a user's request for a transfer of funds then fraud system 470 may monitor for suspicious or unauthorized actions by determining if the behavior is expected or outside of a user's normal activities. For example, if a user wishes to perform a permission change, the request may first be sent to fraud system 470 to determine if the permission change is legitimate, and if fraud system 470 determines the permission change request to be legitimate, then the permission change request may be send to a user device for authorizer 120. Fraud checks may include identity verification, behavioral analysis, device checks, network checks, geolocation checks, whitelist or blacklist checks, etc. Identity verification may be the process of confirming that an individual is who they claim to be, typically using credentials, biometrics, or other authentication methods. Behavioral analysis may be monitoring and analyzing user actions and patterns to identify deviations or anomalies that may indicate fraudulent activity. Device checks may be analyzing the characteristics of a device (e.g., user device 402), including IP address, browser, or hardware details, to identify anomalies or potential fraudulent activity. Network checks may be analyzing the network characteristics, such as IP addresses and connection types, to detect anomalies or signs of malicious or unauthorized activity. Geolocation checks may be using the geolocation to analyze a user's location and compare the location to a known list of locations a user normally is associated with. A whitelist may be a list of approved entities, such as users, user devices, IP addresses, etc., that are granted access to an account or portion of entitlements engines 210. A blacklist may be a list to which access for such entities should be restricted. For example, geolocation checks may include a geolocation associated with an IP address where user 110 has logged in.

In some embodiments, fraud detection may be done in real-time to provide immediate feedback on a potential transfer or potential permission change. For example, if user 110 submits a request for a transfer to entitlements engine 210 through user interface 350, then fraud system 470 may be engaged after submitting the request, or after the transfer has been approved to search for any potential fraud and release funds for the transfer as quickly as possible. In some embodiments, the transfer may be queued in a transfer queue after being approved by authorizer 120. A transfer queue may be a list of transfers to be approved or blocked by authorizers or entitlements engine 210. For example, a transfer queue may be stored in memory 430 until authorizer 120 has reviewed each transfer. In some embodiments, entitlements engine 210 may automatically accept or block transfers and place transfers in a transfer queue until the transfers can be processed. For example, a transfer may required the action of a financial institution and the financial institution may not allow any activity outside of normal working hours. In this example, a transfer queue may hold the transfer until it can be cleared.

In some embodiments, the permissions information may be updated to remove, by a user device associated with authorizer 120, an access permission associated with user 110. This removal of access permission may cause a transfer request to be automatically blocked for the first user. For example, authorizer 120 may remove access to user 110 for an account and database 440 may be updated to reflect the new permissions for user 110 for that account. In such embodiments, a permission change may remove permission for user 110 to access a particular account. In some embodiments, the updated permissions information may include removal of user 110 from permissions to prevent access of user 110 to entitlements engine 210. For example, user 110 may be fired from a position at an entity involved in the family office or may be reassigned to a role with a different set of permissions associated with one or more accounts. Removal of user 110 in such a situation may be important to prevent theft of funds or other potentially fraudulent activity. For example, removal of user 110 may include changing permissions stored in database 440 to remove access of user 110 to their accounts such that when entitlements engine 210 detects a login from user 110, entitlements engine 210 may block user 110.

In some embodiments, a transfer request for a transfer may be automatically approved or disapproved based on rules established by authorizer 120. The rules may be any criteria that are triggered when predefined conditions are met. The rules may include transfer amounts, frequency, locations, times, groups of users allowed, attempts at a permission change, etc. For example, authorizer 120 may set a rule that under a threshold for a number of transfers, a transfer for user 110 is automatically approved, but above the threshold, a transfer is blocked. In another example authorizer 120 may block user 110 from the performed transfer during particular dates or times. In some embodiments, rules may be established based on permission levels for users. For example, when a new user is added with a particular permission level, entitlements engine 210 may automatically associate the new user with access to particular accounts associated with the permission level.

In some embodiments, a request for a permission change may be automatically approved or disapproved based on rules established by authorizer 120. For example, automatic approval or disapproval may be performed using a whitelist or blacklist, respectively. For example, authorizer may set a rule that users with particular last names may automatically be granted access to particular accounts upon request.

In some embodiments, a transfer request may be automatically approved or disapproved based on a machine learning model trained on previous transfer data. A machine learning model may be a model trained on a dataset to make predictions or decision based on new input data. A machine learning model may include linear regression, logistic regression, decision trees, random forests, artificial intelligence (AI), support vector machines, neural networks, K-nearest neighbors, clustering algorithms, etc. Training the model may be performed using a training dataset to learn relationships between the inputs, associated with users and accounts, and outputs, associated with transfers and permission changes, of the machine learning model to improve performance and minimize errors in predictions. Training the model may include using previous transfer data, such as any previous transfers performed by users in the family, previous permission levels, similar account types, similar users (e.g. same name), etc. Previous transfer data may include the users, dates, times, amounts, sending account, receiving account, and any other data that may be associated with previous transfers. Using the previous transfer data, a machine learning model may predict whether a transfer may be approved without requiring direct input from authorizer 120. Then future decisions regarding transfer or permission changes may be performed automatically by entitlements engine 210 or application 412 using the machine learning model.

In some embodiments, a request for a permission change may be approved or disapproved based on a machine learning model trained on previous permissions information. Previous permissions information may be any information related to previous permission changes. For example, authorizer 120 may be determined to regularly approve permissions for a particular user for particular accounts and predict that authorizer 120 will approve a request for a permission change. A machine learning model used for such predictions may be regularly updated or adaptive. For example, training data may be updated to enable adaptive learning or improved accuracy of results (i.e., prediction of permission changes or transfers). For example, information associated with transfers or permission changes performed over time may be used to continuously improve the model.

Permissions information may include information obtained by incorporation of legal documents received by server 410. Legal documents may be documents relating to user information, account information, or permissions information. Legal documents may include delegation forms. Delegation forms may be documents used to assign responsibility a person, user, or entity over another. For example, a delegation form may be used to assign a permission level of authorizer 120 relative to a permission level of user 110. In some embodiments, receiving a request to change permissions or a transfer request initiates delegation forms to be completed automatically using a machine learning model. For example, the correct delegation forms may automatically be determined and received. The delegation forms may be automatically filled out using predicted information based on the machine learning model. For example, the machine learning model may determine what permission levels user 110 should be given for various accounts and delegation forms may be automatically filled based on information associated with user 110 and the accounts in associated with the permission levels assigned to user 110.

Figure 5:
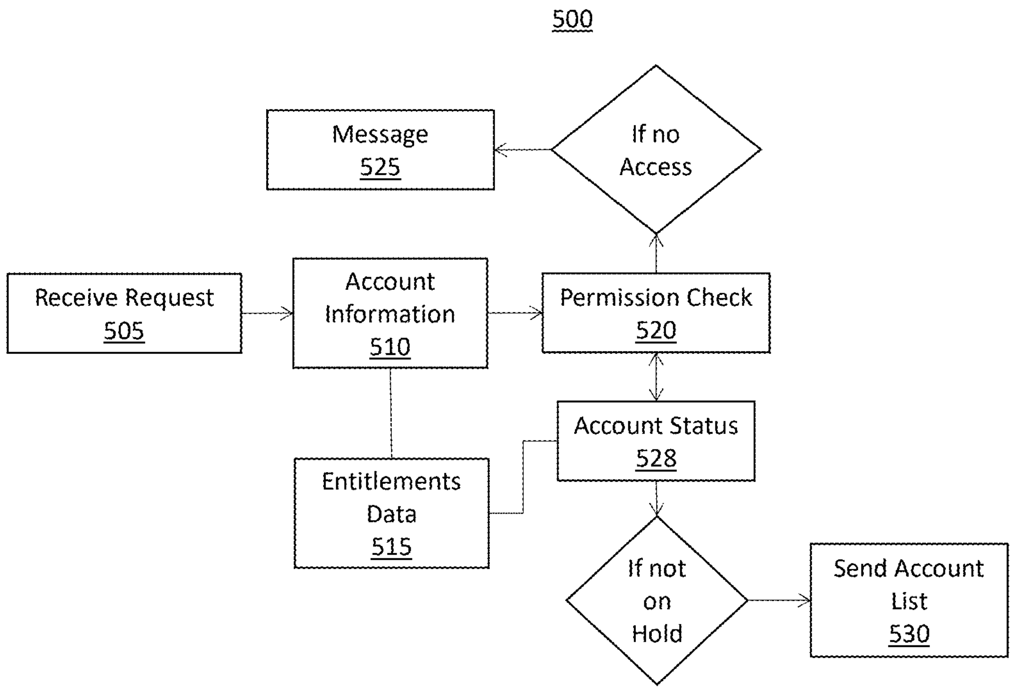
FIG. 5 is a flowchart illustrating an example process for checking permissions, consistent with the disclosed embodiments.

FIG. 5 is a flowchart illustrating example process 500 for checking permissions, consistent with the disclosed embodiments. FIG. 5 incorporates by reference some elements of FIGS. 1-4. FIG. 5 may incorporate any of the components of system environment 400. When a user (e.g., user 110 in FIG. 1) attempts to access entitlements engine 210 (e.g., to view accounts in the family office), a server (e.g., server 410 in FIG. 4) may receive request 505 from the user (e.g., user 110 in FIG. 1) to obtain account information 510. Account information 510 may be any information related to the accounts accessible by user 110. Information related to the user may be sent to database 440. Entitlements data 515 may include information stored in database 440 or any information related to relationships between users of the family or accounts in the family office. Entitlements data may be any data associated users (e.g., user 110 or authorizer 120 in FIG. 1), accounts, permissions, etc. (e.g., associated with entitlements engine 210 from FIG. 2). A request from user 505 may be received by server 410. Account information 510 may be pulled from entitlements data 515 stored in database 440. Permission check 520 may pull information from database 440 to verify that user 110 has the appropriate permissions to access account information 510. If permissions check 520 fails, message 525 may be sent to user 110 notifying them that access is restricted. If permissions check 520 is successful, account status 528 may be requested from user data 515. Account status 528 may be the current state of a financial account. Account status 528 may include whether the account is active, inactive, suspended, delinquent, closed, in good standing, details on outstanding balances, payment history, and any restrictions of the account. An account may be on hold if access to transfer funds to or from the account is restricted. If the account is not on hold, then the server may send account list 530 to the user (e.g., user 110 in FIG. 1) to be displayed on a user interface on a user device. The account list may be a list of accounts affiliated with the user. The account list may include any information related to accounts for which the user has access to view.

Figure 6:
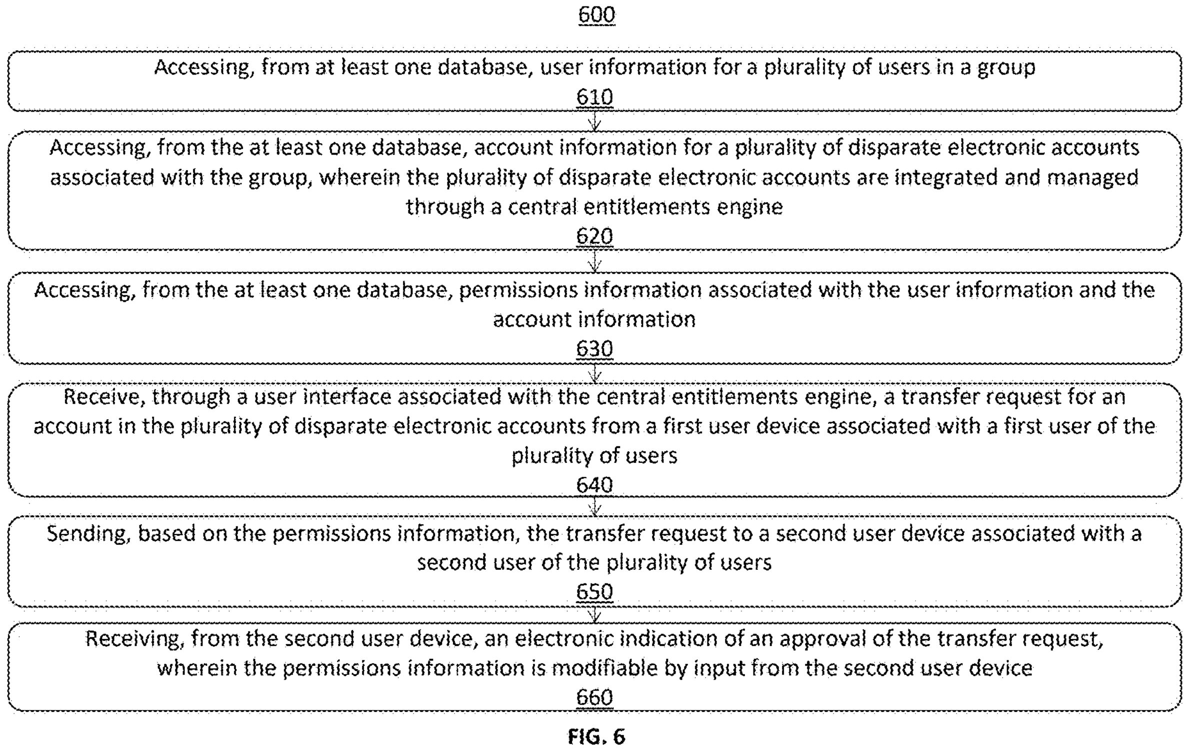
FIG. 6 is a flowchart illustrating an example process for receiving an approval of a transfer request.

FIG. 6 is a flowchart illustrating example process 600 for receiving an approval of a transfer request. FIG. 6 may incorporate any component of system environment 400, or any step of process 500 or process 550. Process 600 may be implemented using any of the embodiments disclosed herein or depicted in FIGS. 1-5B.

Step 610 of process 600 may include accessing, from at least one database, user information for a plurality of users in a group. The group may be individual members of a family or business, including employees or employers, or other entities such as businesses or financial institutions or companies. User information may be any data associated with an individual. For example, user information may be associated with user 110 or authorizer 120 from FIG. 1. For example, the user information may be accessed by searching the database for relevant information using a processor and storing the information in memory temporarily. Accessing the information may include moving some of the information to memory or using references affiliated with the information such as indexes or memory address locations associated with where the information may be stored for access.

Step 620 of process 600 may include accessing, by the at least one processor from the at least one database, account information for a plurality of disparate electronic accounts associated with a group. The plurality of disparate electronic accounts may be integrated and managed through a central entitlements engine (e.g., entitlements engine 210 in FIG. 2). Integrating the user information and the account information may include obtaining and providing the information from a database or from accounts associated with other servers or other financial institutions in a single platform that is accessible to various users in the group. The central entitlements engine may be an entitlements engine that is centralized to allow the ability to access and integrate various accounts for management or for viewing by various members of the group. The central entitlements engine may be a part of a centralized platform. For example, a centralized platform may be used to display the various accounts associated with a family office and allow members of the family office to access, maintain, or perform actions associated with the various accounts. The centralized platform may include operation of an application that allows the central entitlements engine to interface with various user devices operated by the users associated with the group.

Step 630 of process 600 may include accessing, by the at least one processor from the at least one database, permissions information associated with the user information and the account information. Permissions information may be any information related to permissions or permission levels associated with a user associated with a family office. For example, the permissions information may include access levels associated with any of the plurality of disparate electronic accounts associated with the family office.

Step 640 of process 600 may include receiving, through a user interface associated with the central entitlements engine, a transfer request for an account in the plurality of disparate electronic accounts from a first user of the plurality of users. A transfer request may be for a transfer to, from, or between accounts associated with the family office. For example, a user may initiate a transfer request from an account to purchase stocks of a company.

Step 650 of process 600 may include sending, based on the permissions information, the transfer request to a second user. A second user may be an authorizer of transfer requests. For example, an authorizer may be a supervisor, CEO, etc., responsible for maintaining an account in the family office.

Step 660 of process 600 may include receiving, from the second user, an approval of the transfer request, wherein the permissions information is modifiable by input from the second user device. Permissions information may be information that represents the permission levels associated with the various users of a group. Modifiable may refer to being able to change the permissions information associated with a user or account in the group. An authorizer may provide, through a user device, an approval of the transfer request, allowing a user to complete a transfer request. After this, funds may be exchanged. For example, a user may initiate a request to access an account and this may trigger a permission change request with the entitlements engine, which may notify an authorizer of the request, allowing the authorizer to modify permission information to allow the request.

Figure 7:
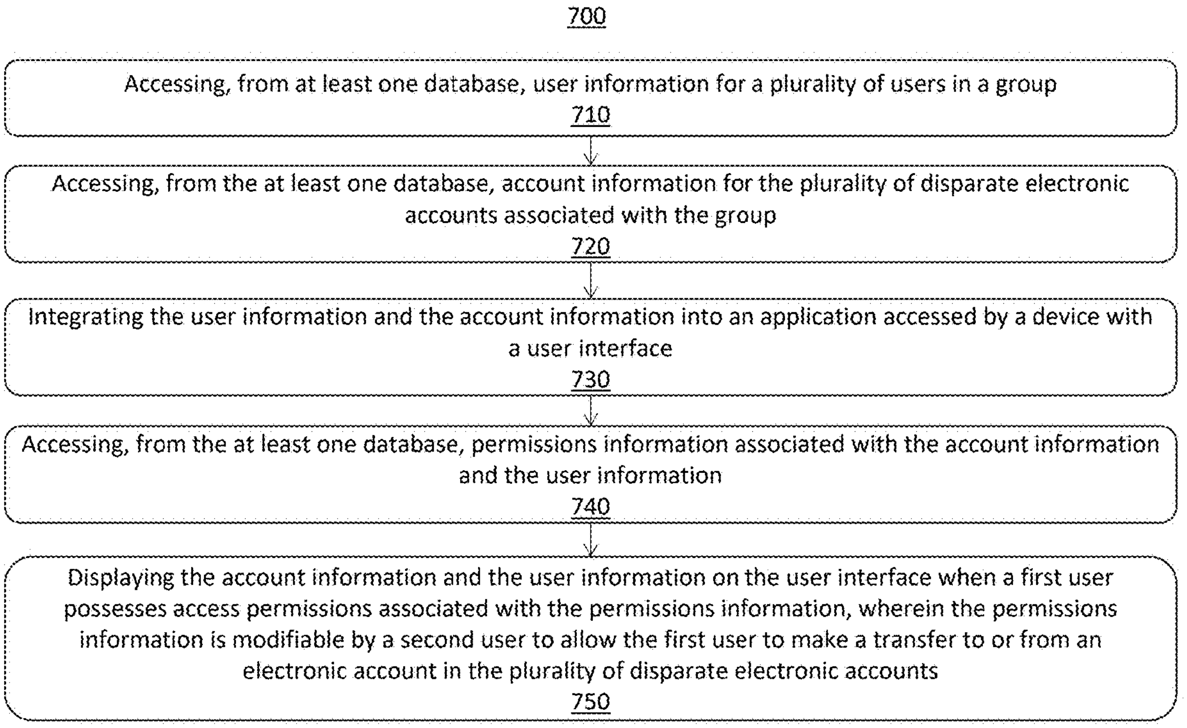
FIG. 7 is a flowchart illustrating an example process for updating permissions, consistent with disclosed embodiments.

FIG. 7 is a flowchart illustrating example process 700 for updating permissions, consistent with disclosed embodiments. FIG. 7 may incorporate any component of system environment 400, or any step of process 500 or process 550. Process 700 may be implemented using any of the embodiments disclosed herein or depicted in FIGS. 1-5B.

Step 710 of process 700 may include accessing, from at least one database, user information for a plurality of users in a group. The group may be individual members of a family or business, including employees or employers, or other entities such as businesses or financial institutions or companies. User information may be any data associated with an individual. For example, user information may be associated with user 110 or authorizer 120 from FIG. 1. For example, the user information may be accessed by searching the database for relevant information using a processor and storing the information in memory temporarily. Accessing the information may include moving some of the information to memory or using references affiliated with the information such as indexes or memory address locations associated with where the information may be stored for access.

Step 720 of process 700 may include accessing, from the at least one database, account information for the plurality of disparate electronic accounts associated with the group. The plurality of disparate electronic accounts may be integrated and managed through a central entitlements engine. (e.g., entitlements engine 210 in FIG. 2). The central entitlements engine may be an entitlements engine that is centralized to allow the ability to access and integrate various accounts for management or for viewing by various members of the group. The central entitlements engine may be a part of a centralized platform. For example, a centralized platform may be used to display the various accounts associated with a family office and allow members of the family office to access, maintain, or perform actions associated with the various accounts. The centralized platform may include operation of an application that allows the central entitlements engine to interface with various user devices operated by the users associated with the group.

Step 730 of process 700 may include integrating the user information and the account information into an application (e.g., application 412 of FIG. 4) accessed by a device with a user interface. Integrating the user information and the account information may be obtaining and providing the information from a database or from accounts associated with other servers or other financial institutions in a single platform that is accessible to various users in the group. For example, the application may be run on a centralized platform, such as one that operates a central entitlements engine, that may provide access to information associated with various accounts and users in a family office.

Step 740 of process 700 may include accessing, from the at least one database, permissions information associated with the account information and the user information. Permissions information may be any information related to permissions or permission levels associated with a user associated with a family office. For example, the permissions information may include access levels associated with any of the plurality of disparate electronic accounts associated with the family office.

Step 750 of process 700 may include displaying the account information and the user information on the user interface (e.g., user interface 350 of FIGS. 3A-4) when a first user possesses access permissions associated with the permissions information. The permissions information may be modifiable by a second user to allow the first user to make a transfer to or from an electronic account in the plurality of disparate electronic accounts. Permissions information may be information that represents the permission levels associated with the various users of a group. Modifiable may refer to being able to change the permissions information associated with a user or account in the group. For example, the second user may be an authorizer who changes permissions for the first user such that the updated permissions allow the first user to complete transfers.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. A system for approving a transfer comprising:
at least one memory storing instructions; and
at least one processor configured to execute the instructions to perform operations to:
access, from at least one database, user information for a plurality of users in a group;
access, from the at least one database, account information for a plurality of disparate electronic accounts associated with the group, wherein the plurality of disparate electronic accounts are integrated and managed through a central entitlements engine that defines permissions information for the plurality of users, the permissions information including hierarchical permission levels for the plurality of users;
access, from the at least one database, the permissions information;
receive, through a user interface associated with the central entitlements engine, a transfer request for an account in the plurality of disparate electronic accounts from a first user device associated with a first user of the plurality of users;
determine, based on the permissions information, that approval of the transfer request is required from a second user of the plurality of users, the second user having a higher hierarchical permission level than the first user;
send, based on the permissions information, the transfer request to a second user device associated with the second user;
receive, from the second user device, an electronic indication of an approval of the transfer request,
wherein the permissions information is modifiable by input from the second user device;
approve or disapprove a request for a permission change associated with the permissions information based on at least one machine learning model trained on previous permissions information; and
initiate and complete, after receiving the request for the permission change, a delegation form automatically using the at least one machine learning model.

2. The system of claim 1, wherein the transfer request includes a first account in the plurality of disparate electronic accounts for sending the transfer and a second account in the plurality of disparate electronic accounts for receiving the transfer, and the first and second accounts are maintained by one entity.

3. The system of claim 1, wherein the transfer request includes a first account in the plurality of disparate electronic accounts for sending the transfer and a second account in the plurality of disparate electronic accounts for receiving the transfer, and the first and second accounts are each maintained by different entities.

4. The system of claim 1, wherein the second user device is configured to provide an indication of approval for approve transfers for the plurality of disparate electronic accounts.

5. The system of claim 1, wherein the processor is further configured to send an authentication request to the first user device or the second user device and receive an authentication response to provide access to an application through the user interface, wherein the user interface is configured to receive input from the first user or the second user.

6. The system of claim 5, wherein the application is configured to allow the first user device or the second user device to access the user information, the account information, and the permissions information.

7. The system of claim 6, wherein the application is configured to allow the second user device to update the user information, the account information, or the permissions information.

8. The system of claim 1, wherein the processor is further configured to send the transfer request to a fraud monitoring application and receive a response from the fraud monitoring application providing a notification on the second user device of a detected fraudulent activity.

9. The system of claim 1, wherein the processor is further configured to automatically approve or disapprove the transfer request based on rules established by the second user.

10. The system of claim 1, wherein the processor is further configured to automatically approve or disapprove the transfer request based on a machine learning model trained on previous transfer data.

11. The system of claim 1, wherein the processor is further configured to update the permissions information to remove, by the second user, an access permission associated with the first user.

12. The system of claim 1, wherein the processor is further configured to send a permissions change request to a fraud monitoring application and receive a response from the fraud monitoring application informing the second user of a detected fraudulent activity.

13. The system of claim 1, wherein the central entitlements engine is configured to provide an account update for each of the plurality of disparate electronic accounts for the group and the user interface displays the account updates.

14. The system of claim 1, wherein the processor is further configured to receive, from a third user device associated with a third user of the plurality of users, a second electronic indication of a second approval of the transfer request, wherein the permissions information is modifiable by input from the third user device.

15. The system of claim 1, wherein the second user device is configured to receive a plurality of transfer requests simultaneously and allow the second user to select the plurality of transfer requests to approve.

16. The system of claim 1, wherein the processor is configured to, based on the permissions information, assign each user of the plurality of users to one of a plurality of predefined hierarchical roles, each predefined hierarchical role defining a corresponding scope of authority.

17. The system of claim 1, wherein the processor is further configured to automatically escalate the transfer request to a next higher hierarchical permission level when the first user and the second user lack authority to approve the transfer request.

18. A computerized method for approving an electronic transaction between at least two disparate electronic accounts, the method comprising:
accessing, from at least one database, user information for a plurality of users in a group;
accessing, from the at least one database, account information for a plurality of disparate electronic accounts associated with the group, wherein the plurality of disparate electronic accounts are integrated and managed through a central entitlements engine that defines permissions information for the plurality of users, the permissions information including hierarchical permission levels for the plurality of users;

accessing, from the at least one database, the permissions information;

receiving, through a user interface associated with the central entitlements engine, a transfer request for an account in the plurality of disparate electronic accounts from a first user device associated with a first user of the plurality of users;

determining, based on the permissions information, that approval of the transfer request is required from a second user of the plurality of users, the second user having a higher hierarchical permission level than the first user;

sending, based on the permissions information, the transfer request to a second user device associated with the second user;

receiving, from the second user device, an electronic indication of an approval of the transfer request, wherein the permissions information is modifiable by input from the second user device;

approving or disapproving a request for a permission change associated with the permissions information based on a machine learning model trained on previous permissions information; and initiating and completing, after receiving the request for the permission change, a delegation form automatically using a machine learning model.

* * * * *